United States Patent Office
3,708,347
Patented Jan. 2, 1973

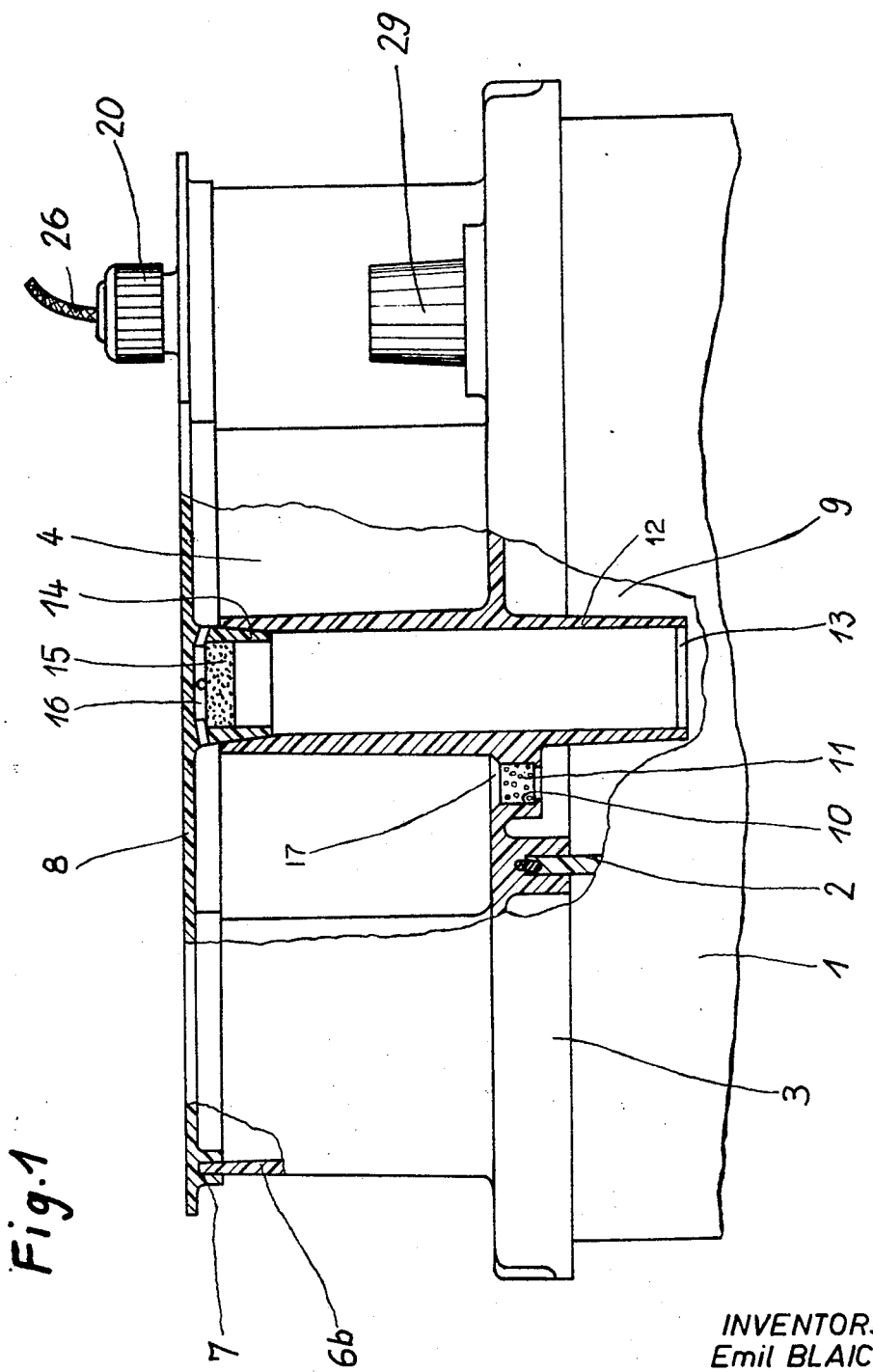

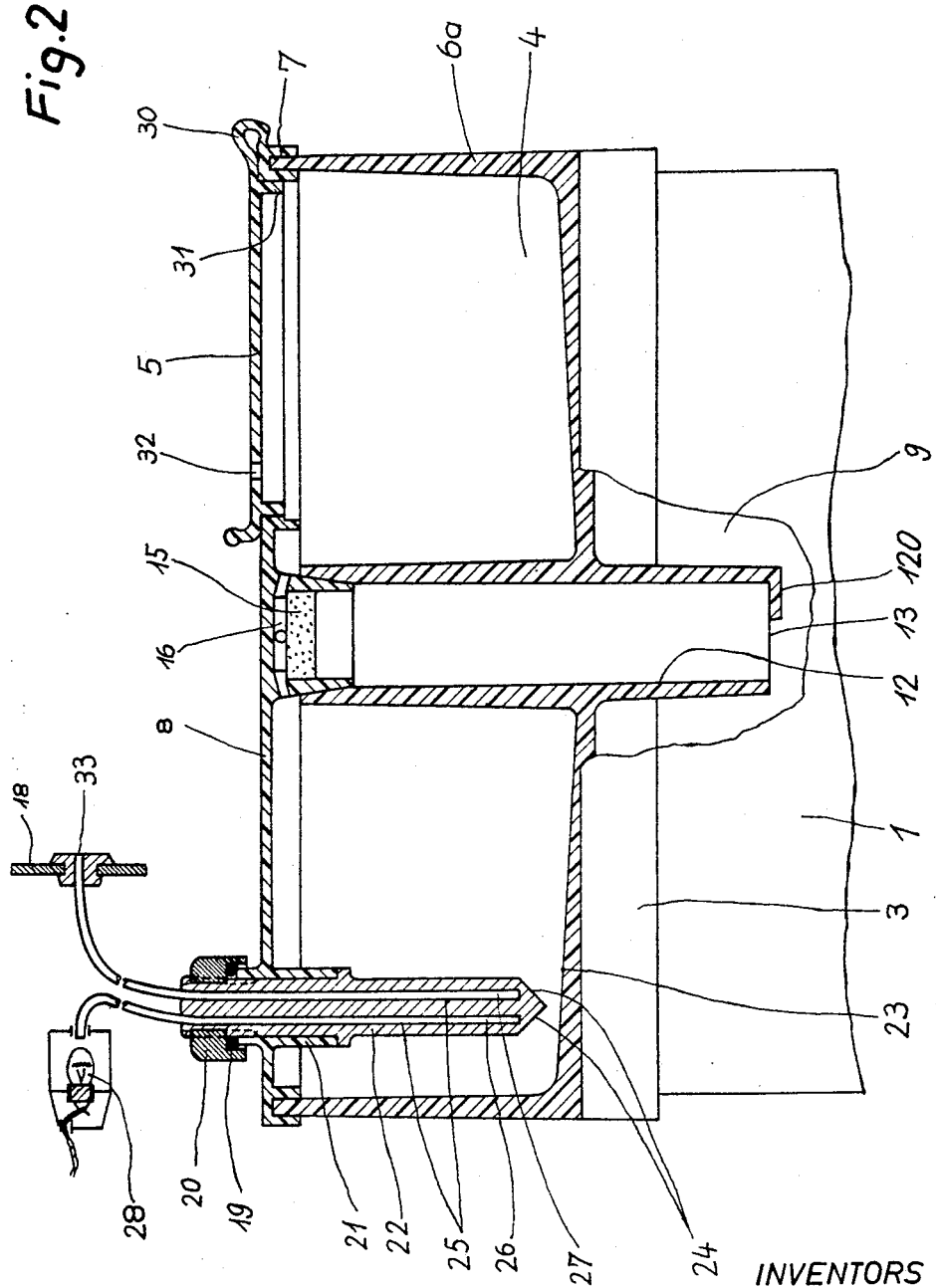

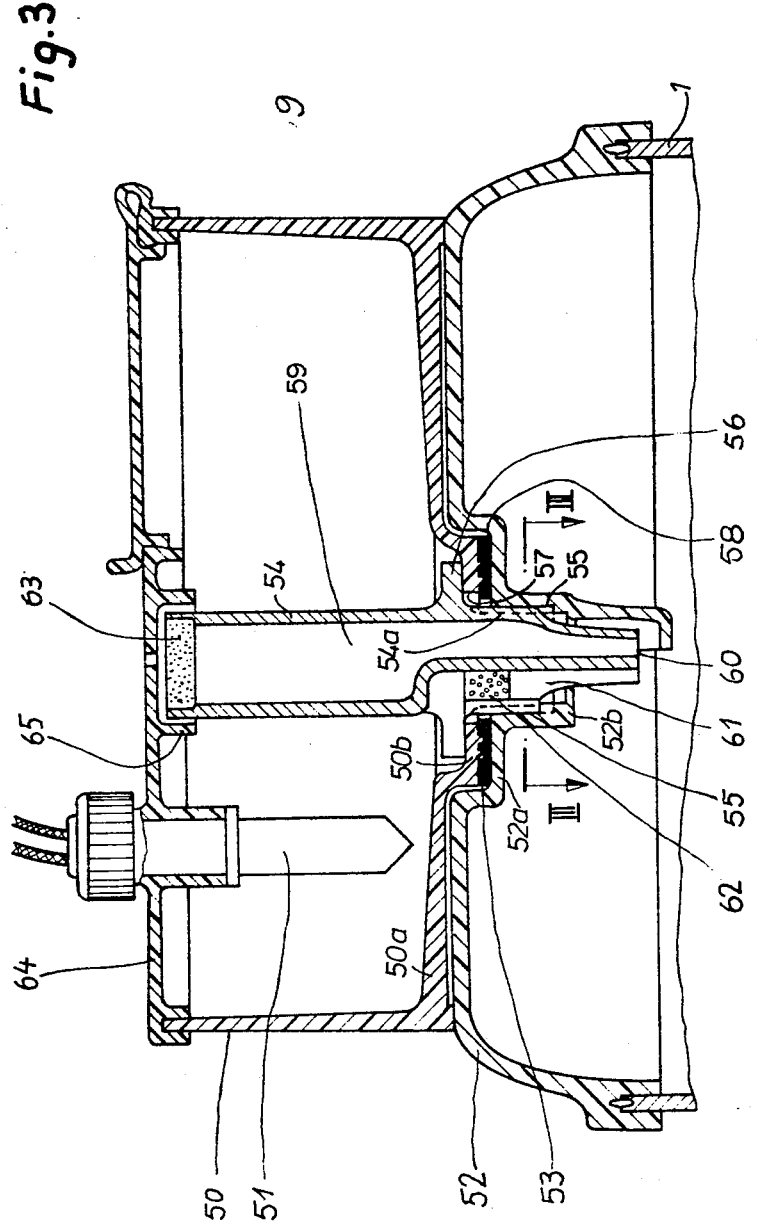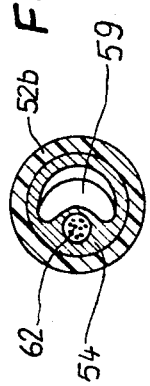

3,708,347
DEVICE FOR REPLENISHING THE LIQUID IN A STORAGE BATTERY
Emil Blaich, Barienrode, Oskar Maier, Hildesheim, and Bodo Ziegler, Stuttgart-Botnang, Germany, assignors to Robert Bosch GmbH, Stuttgart, Germany
Filed Aug. 13, 1970, Ser. No. 63,553
Claims priority, application Germany, Aug. 14, 1969, G 69 32 118.2
Int. Cl. H01m 7/00
U.S. Cl. 136—162     9 Claims

ABSTRACT OF THE DISCLOSURE

A device for replenishing the liquid in a storage battery includes the detachable cover of the container of the battery, and a closed vessel above the cover containing the liquid. Inlet means including a porous liquid-permeable body, and a gas outlet tube closed to the liquid, connect the vessel with the container.

BACKGROUND OF THE INVENTION

The present invention relates to storage batteries, and more particularly to a storage battery which is mounted in a motor car and provided with a device for automatically replenishing the liquid in all cell compartments of the container of the battery so that the electrolyte in the cell compartments is maintained at the required level.

Automatic replenishing devices for storage batteries are known, but due to the vibrations and shocks to which a storage battery is subjected in a motor car, the devices of the prior art cannot prevent the level of the electrolyte to exceed the permissible level, except if mechanical liquid measuring devices are used, which are subject to frequent disturbances.

SUMMARY OF THE INVENTION

It is one object of the invention to overcome the disadvantages of automatic replenishing devices for storage batteries, and to provide a replenishing device which reliably operates, and maintains a selected minimum level of the electrolyte under all operational conditions.

Another object of the invention is to provide a device for replenishing liquid in a storage battery without causing a direct short circuit between the cells of the battery.

In accordance with the invention, a vessel holding the liquid by which the storage battery is to be replenished, is arranged on the cover of the container of the storage battery, and preferably has a height of between 10 and 120 millimeters, preferably 50 millimeters. Each cell compartment of the container of the storage battery has at least one inlet opening, and an outlet tube for venting gas developed in the liquid in the container. The inlet openings are filled with a water-permeable porous body having fine pores. The lower end of the venting outlet tube, by which the desired level of the electrolyte is determined, is located below the inlet opening. The upper end of the venting outlet tube projects upwardly beyond the level of the liquid in the replenishing vessel, and is covered with a liquid-repellent gas-permeable material. The replenishing vessel is closed, and provided with normally closed filling means, such as an opening in the top plate of the replenishing vessel, fluidtightly closed by a cover, which may be completely detachable, or mounted on the top plate and have the form of a closure flap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary, partly setional, front view illustrating a storage battery having three cell compartments, and a replenishing device in accordance with one embodiment of the invention;

FIG. 2 is a fragmentary, partly sectional, side elevation of the storage battery of FIG. 1;

FIG. 3 is a fragmentary sectional view illustrating another embodiment of the invention; and FIG. 4 is a sectional view taken on line III—III in FIG. 3.

DESCRIPTION OF THE PREFERRED EMBODIMENTS

Referring first to the embodiment of FIGS. 1 and 2, a storage battery of conventional construction has a container 1 divided by partitioning walls 2 into three cell compartments. The open top of the container is closed by cover 3 which is the bottom wall of a vessel 4 having side walls 6a and 6b, and a closure top wall 8 formed with a downward open peripheral recess 7 in which the top ends of the side walls 6a, 6b are located so that top plate 8 fluidtightly closes vessel 4, which contains a replenishing liquid, such as pure water, for replenishing the electrolyte in the cell compartments of container 1, when the level of the same drops below a given minimum.

Cover 3 has in the region of each cell compartment 9, an inlet portion formed with an opening 10 filled with a water-permeable porous body 11 consisting, for example, of sintered polyvinylchloride, and serving as a water lock 17 during the automatic replenishing of the electrolyte in container 1 by liquid flowing from vessel 4 through the inlet means 10, 11, 17.

The top surface 23 of bottom wall 3 of vessel 4 is downwardly slanted from the opposite side walls 6a towards the inlet opening 10 so that all the water in vessel 4 can flow into the cell compartments, if required.

Cover 3 further supports, and is integrally formed with, outlet tubes 12 whose lower ends 13 are located in the cell compartments of container 1, respectively and determine the level of the electrolyte in the same. The outlet tubes 12 project upward into vessel 4, and have an upper end spaced a small distance from the top plate 8. The upper end of each outlet tube 12 is closed by a plug 14 which projects downward from top plate 8, and has an opening filled by a water-repellent, but gas-permeable member 15, which may consist of sintered polyethylene. The tubular plug 14 has outlet conduits 16 communicating with the upper portion of vessel 4 directly under top plate 8 so that gas passing through member 15, enters the vessel 4 above the level of the water in the same.

The outlet tubes 12 are used for filling the electrolyte into container 1 when the same is filled the first time, and are provided with inner projections 120 at the lower ends 30 by which the filling level of the electrolyte can be visually controlled. The free diameter of each outlet tube 12 is about 14 millimeters so that it is possible to insert into tubes 12 a hydrometer for measuring the specific gravity of the electrolyte in the cell compartments 9.

In the top plate 8 of replenishing vessel 4, a sensing means is mounted, which produces a warning signal when the level of the water in vessel 4 drops below a minimum level. In accordance with the prior art, level indicating means are provided in the cell compartments of the battery, and are subjected to the corroding effect of the electrolyte, and moreover, it is necessary to provide each cell compartment with an individual indicator, if all cells are to be controlled.

Since in accordance with the invention, the sensing means of the minimum level indicator are provided in vessel 4 which is common to all cells, only a single sensing means and indicator is required which, moreover, is not in contact with the corroding electrolyte, but with pure water in the replenishing vessel 4. A body consisting of polymethacrylate 22 is mounted in a tubular portion 21 of top plate 8, secured to the same by a nut 20, sealed by a sealing ring 19. The lower end of body 22 is bounded by two prism faces 24 whose apex is located closely adjacent the top surface 23 of the bottom wall 3 of vessel 4. Body 22 has two parallel longitudinal bores 25 which have lower ends adjacent prism faces 24. Light-guiding ropes 26 and 27 are inserted into bores 25, each light-guiding rope consisting of parallel light-guiding fibers enveloped by a polyvinylchloride tube. Light-guiding rope 26 has a free end located opposite a lamp 28 so that light rays pass through light-guiding rope 26. The other light-guiding rope 27 has a free end connected with the dashboard 18 of the car on which the storage battery is mounted, and has an end face 33.

Details of the storage battery, such as the plates cell connectors and plate strap are not shown in the drawing for the sake of simplicity, only a terminal post 29 of one cell being shown.

The replenishing device described with reference to FIGS. 1 and 2 is operated as follows:

When the level of the electrolyte in any one cell compartment 9 does not reach the lower end 13 of the respective venting outlet tube 12, water flows from vessel 4 through the water lock 17 and the porous body 11 into the respective cell compartment until the level of the electrolyte has been raised sufficiently to the height of the lower open end 13 of the venting outlet tube 12, so that the air in the upper part of the respective cell compartment 9 cannot escape through the venting outlet tube 12 any longer and thus the entering of additional replenishing liquid from the vessel 4 into the cell compartment is prevented. The water-permeable sintered porous body 11 in water lock 17 prevents the entering of too much water into the respective cell compartment 9, even if container 1 is subjected to strong vibrations and shocks during movement of the car. In order to prevent the escape of electrolyte from the venting outlet tube 12 due to the development of gas during the charging of the storage battery, the water-repellent, but gas-permeable porous plug 15, which closes the upper end of the venting outlet tube 12, prevents the passage of water or electrolyte, but permits the passage of gas which flows through conduits 16 into the upper portion of vessel 4.

When the level of the water in vessel 4 is low, the closure flap 5, which is pivotally mounted at 30, is turned to an open position, exposing a large filling opening in top plate 8 of vessel 4. A small venting opening 32 is provided in the closure flap 5 and permits escape of the small amount of gas flowing through gas permeable plug 15 and conduits 16 into the upper portion of vessel 4.

When the level of the water in vessel 4 drops below a minimum, the prism faces 24 are no longer located in the water, but above the same in air, so that they become reflective. Consequently, the light from lamp 28 passing through light-guiding rope 26 is reflected by the two prism faces 24, and enters the light-guiding rope 27 so that the end face 33 appears to be illuminated to the driver of the car who is thus informed of the low level of the replenishing water in the vessel 4, and can add water after opening the closure flap 5. Closure flap 5 has a downwardly projecting peripheral flange 31 fluidtightly sealing the filling opening in the closed position of the closure flap.

The embodiment of FIGS. 3 and 4 has a replenishing device which is advantageously used with the standard cover 52 of a storage battery. In this embodiment, the replenishing vessel 50 with the sensing and indicating means 51 mounted on the detachable top plate 64, of vessel 50 has a bottom wall 50a, and is placed with the same on top of the cover 52. A sealing ring 53 is provided between a flange 50b of bottom wall 50a, and an annular portion 52a of cover 52. A tubular portion 52b projects downwardly from the annular portion 52a, and has an inner thread 55. Flange 50b forms an aperture in the bottom wall 50a, and tubular portion 52b of cover 52 forms another aperture, the apertures being substantially aligned.

A molded body 54 has a tubular portion 54a with an outer thread engaging the inner thread 55 of tubular portion 52b. The molded body 54 has a flange 56 pressing against the inner flange 50b so that vessel 50 is secured to cover 52 when body 54 is threaded into the tubular portion 52b. Body 54 passes through an aperture surrounded by flange 50b of vessel 50, and through a registering aperture surrounded by the tubular portion 52b. The bottom face of the annular flange 50b has annular downwardly projecting ribs which are pressed into the yielding material of the sealing ring 53 to assure reliable sealing.

Body 54 combines the venting outlet tube with the inlet means of the embodiment of FIGS. 1 and 2. Body 54 is substantially tubular, and forms a venting duct 59 having an open lower end 60 at which the normal level of the electrolyte in container 1 is located. A second conduit 61 forms an inlet opening in which a liquid permeable porous body 62 is located, which preferably consists of sintered polyvinylchloride. The upper end of the tubular portion of body 54 is closed by a member 63 which is water-repellent and gas-permeable, and made of sintered polyethylene. The plug 63 is directly mounted in the upper end of the tubular portion of body 54, and is spaced a small distance from the bottom face of the top plate 64 by which vessel 50 is closed. A tubular flange 65 surrounds the upper end of body 54 and prevents splashing by escaping gas.

The function of the embodiment illustrated in FIGS. 3 and 4 is the same as described with reference to the embodiment of FIGS. 1 and 2. The structure is different inasmuch as the vessel 50 has its own bottom wall 50a in the embodiment of FIG. 3, whereas the bottom wall of vessel 4 is formed by the cover 3 in the embodiment of FIGS. 1 and 2. Since vessel 50 is not integral with cover plate 52, body 54 is constructed as a unit combining the inlet means with the venting outlet tube, and also serving for securing the vessel 50 to the cover 52, using the aperture formed in the standard cover 52 by the tubular portion 55 into which a plug is threaded when the replenishing device of the present invention is not provided.

The container 1 and the cell compartments consist of a synthetic material, such as polystyrol, polypropylene, polyethylene or ebonite. The porous bodies 11 and 62 in the inlet means consist of a sintered synthetic material, such as polystyrol, or polyvinylchloride. The gas-permeable but liquid-repellent plugs 15 and 63 consist of a sintered synthetic material having very fine pores, preferably of polyethylene, and is made water repellent by impregnation with silicon, paraffin, or polytetrafluorethylene. The bottom surface 23 of the replenishing vessel is preferably slanted at an angle of 3° toward the inlet means into the container 1 of the storage battery.

Instead of the construction shown in FIG. 1 in which the vessel 4 is integral with cover 3, or the construction of FIG. 3 in which vessel 50 is secured by threaded means to the cover 52, it is also possible to attach a replenishing vessel, which is separately manufactured, by adhesively bonding, or injection molding welding to the cover of the container for the electrolyte.

While the closure 5 of the filling means is shown to be pivotally mounted on vessel 4, it will be understood that a round filling opening, closed by a detachable closure, can be used.

It will be understood that each of the elements described above, or two or more together, may also find a useful application in other types of devices for replenishing the liquid in a storage battery differing from the types described above.

While the invention has been illustrated and described as embodied in a device for automatically replenishing the electrolyte in the cell compartments of the container of a storage battery, by water flowing slowly through a porous body from a replenishing vessel into the respective compartment cell, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a storage battery having an open top and forming at least one cell compartment; and an electrolyte liquid in said cell compartment, in combination, a device for replenishing the liquid in said cell compartment comprising a cover means for closing said open top of said container, and having a first aperture, wall means forming a closed vessel for a replenishing liquid above said cover means and having normally closed filling means, said wall means including a bottom wall having a second aperture registering with said first aperture; inlet means connecting said vessel with said compartment and including a liquid permeable porous body through which said replenishing liquid flows from said vessel into said cell compartment, and outlet tube means having an open lower end located in said cell compartment below said inlet means so that flow of said replenishing liquid through said inlet means stops when the level of the electrolyte liquid in said cell compartment reaches said lower end, and having an upper end located in the upper portion of said vessel above a selected level of the replenishing liquid of the same, and water repellent gas-permeable means closing said upper end to said electrolyte liquid, but venting gas developing in the electrolyte liquid in said cell compartment and rising in said outlet tube means, said inlet means and said outlet tube means being connected and forming a unit located in said apertures and securing said bottom wall, and thereby said vessel, to said cover means.

2. Replenishing device as claimed in claim 1 wherein said unit has a portion threaded into said first aperture, and a flange abutting the top face of said bottom wall around said second aperture for pressing said bottom wall against said cover means; and wherein said porous body is located substantially at the level of said bottom wall below said flange.

3. In a storage battery including a container having an open top and forming at least one cell compartment; and an electrolyte liquid in said cell compartment, in combination, a device for replenishing the liquid in said cell compartment comprising cover means for closing said open top of said container, wall means forming a closed vessel for a replenishing liquid above said cover means, and having normally closed filling means, said wall means including side wall means and a detachable top plate fluid-tightly engaging said side wall means, inlet means connecting said vessel with said cell compartment and including a liquid permeable porous body through which said replenishing liquid flows from said vessel into said cell compartment, outlet tube means having an open lower end located in said cell compartment below said inlet means so that flow of said replenishing liquid through said inlet means stops when the level of the electrolyte liquid in said cell compartment reaches said lower end, and having an upper end located in the upper portion of said vessel above a selected level of said replenishing liquid in the same, and a water repellent gas-permeable plug secured to said top plate and inserted into said upper end of said outlet tube means when said top plate is placed on said side wall means.

4. In a storage battery including a container forming a plurality of cell compartments and having an open top; and an electrolyte liquid in said cell compartments, in combination, a device for replenishing the liquid in said cell compartments comprising a cover means for closing said open top of said container, wall means forming a closed vessel for a replenishing liquid above said cover means and having normally closed filing means, a plurality of inlet means connecting said vessel with each of said cell compartments, respectively, each inlet means including a liquid permeable porous body through which said replenishing liquid flows from said vessel into said cell compartments, a plurality of outlet tube means having open lower ends located in said cell compartments, respectively, below said inlet means so that flow of said replenishing liquid through said inlet means stops when the level of said electrolyte liquid in said cell compartments reaches said lower ends, and having upper ends located in the upper portion of said vessel above a selected level of the replenishing liquid in the same, water-repellent gas-permeable means closing said upper ends to the electrolyte liquid, but venting gas developing in the electrolyte liquid in said cell compartments and rising in said outlet tube means, and a liquid level indicator supported on said wall means and partly located in said vessel.

5. Replenishing devices as claimed in claim 4 wherein said porous body consists of a sintered synthetic material.

6. Replenishing device as claimed in claim 4 wherein said water-repellent gas-permeable means forms a plug located in said upper end of said outlet tube means.

7. Replenishing device as claimed in claim 4 wherein said gas-permeable means includes a porous sintered synthetic material; and wherein said porous sintered material is impregnated with a liquid repellent substance.

8. Replenishing device as claimed in claim 7 wherein said material is polyethylene; and wherein said substance is one of the group consisting of silicon, paraffin, and polytetrafluoroethylene.

9. Replenishing device as claimed in claim 4 wherein said indicator includes means for indicating an undesirably low level of the liquid in said vessel at a location of the car remote from said storage battery.

References Cited

UNITED STATES PATENTS

| 3,466,199 | 9/1969 | Hennen | 136—177 |
| 3,033,911 | 5/1962 | Duddy | 136—177 |
| 3,485,678 | 12/1969 | Blaich et al. | 136—162 |
| 2,663,751 | 12/1953 | Bashara | 136—162 |

FOREIGN PATENTS

| 1,292,375 | 12/1962 | France | 136—177 |
| 1,515,625 | 1/1968 | France | 136—152 |

DONALD L. WALTON, Primary Examiner

U.S. Cl. X.R.

136—177, 182